Jan. 14, 1930. H. H. VAIL 1,743,170
AUTOMATIC CLUTCH FOR AUTOMOBILES
Filed May 13, 1927 2 Sheets-Sheet 1
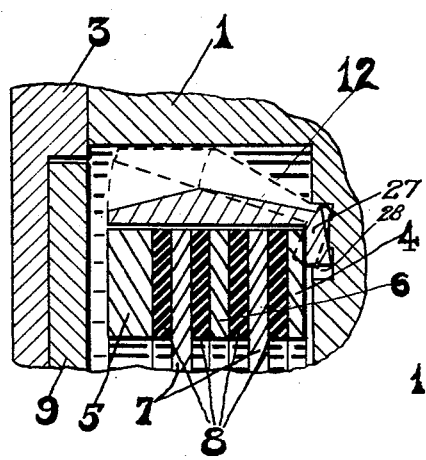
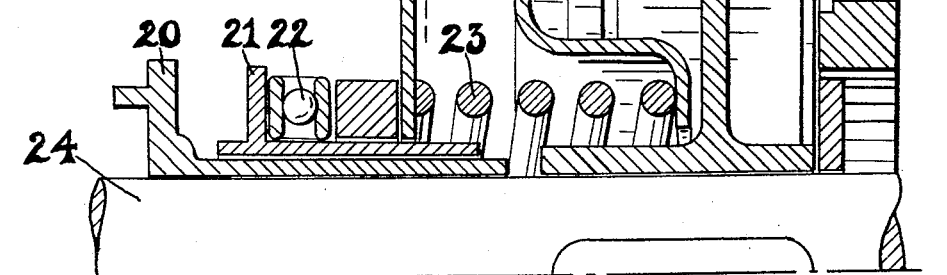
INVENTOR
Henry H. Vail

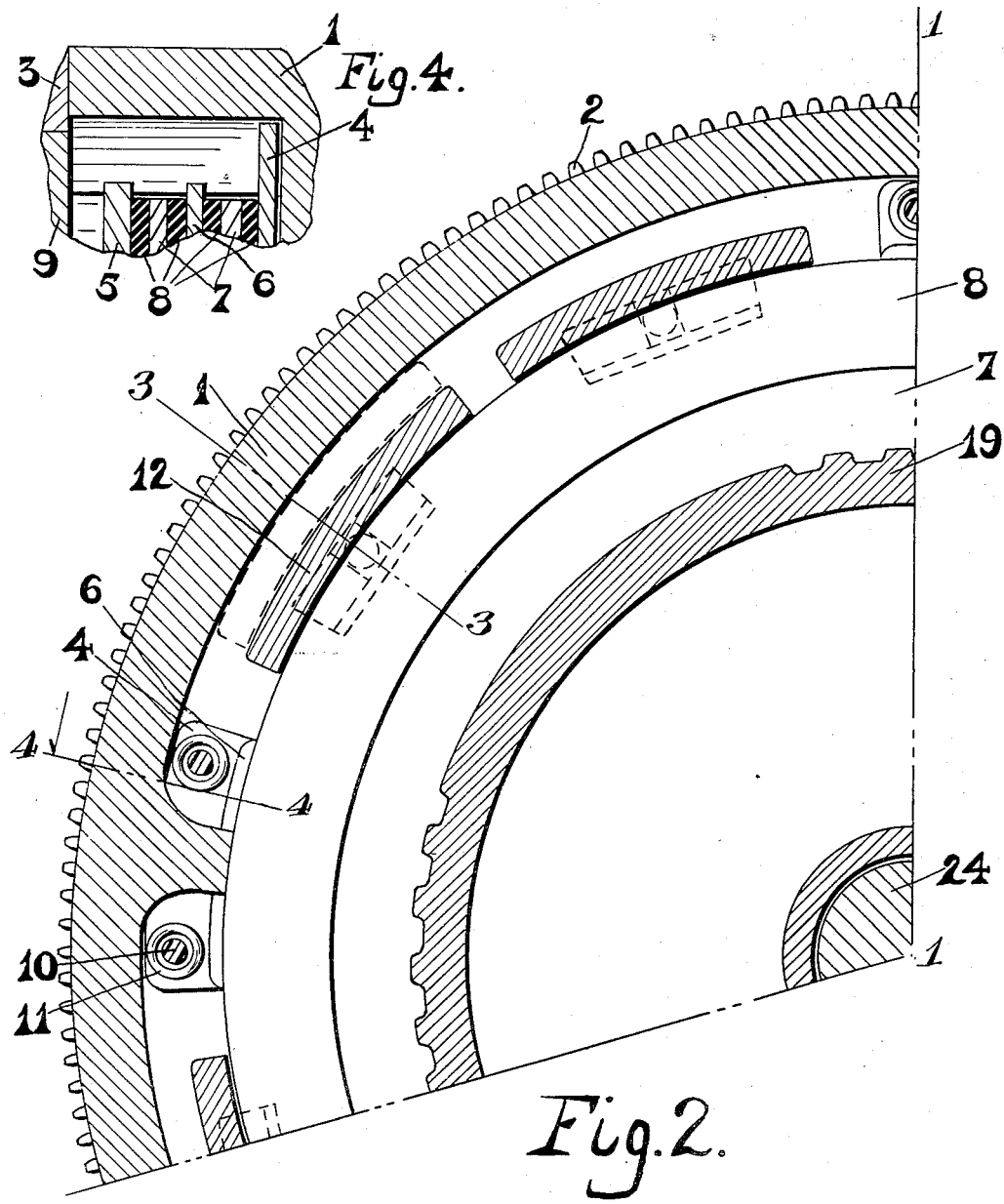

Patented Jan. 14, 1930

1,743,170

UNITED STATES PATENT OFFICE

HENRY H. VAIL, OF CAMDEN, NEW JERSEY, ASSIGNOR TO AUTOMATIC DRIVE AND TRANSMISSION COMPANY, OF GLOUCESTER CITY, NEW JERSEY, A CORPORATION OF NEW JERSEY

AUTOMATIC CLUTCH FOR AUTOMOBILES

Application filed May 13, 1927. Serial No. 191,096.

My invention relates to automatic, centrifugally-operated, multiple-disc clutches adapted for use in automotive vehicles or the like wherein the power is transmitted from a driving shaft to a driven shaft through clutch discs designed to slip at slow vehicular speeds in order to maintain engine speed and power and to function in substantially non-slipping engagement at a predetermined higher engine-speed.

In some designs of this type of clutch there are two separate and distinct clutches, one for automatic and one for manual use. The latter is operated only at such times as may be necessary for gear-shifting. Another type consists of a single automatic clutch provided with manually-operated mechanism for separating the plates so that the clutch becomes inoperative regardless of the centrifugal weights.

The first of the above types is of expensive construction because of the use of two clutches while the second depends upon the functioning of a spring sufficiently strong to resist a lateral movement of the friction discs at all speeds of the engine.

With the above in view, the objects of my invention are to provide a single clutch designed for automatic operation by means of centrifugal weights; as a further object, to provide manually-operated means by which the centrifugal weights may be forced into inoperative position without the use of spring pressure, thereby placing the clutch in such position as to allow the shifting of gears.

A further object is to provide a construction whereby certain parts now in service in automotive vehicles may be used to the fullest extent in changing the present type of manually-operated clutch to a combination manual and automatic clutch of the type described.

With these objects in view, my invention consists of a certain novel construction and arrangement of parts as will be hereinafter pointed out in the specification and claim, reference being had to the accompanying drawing forming part of this specification, in which Figure 1 is a half-section elevation on line 1—1 of Figure 2, showing the relative position of the various parts; Figure 2 is an upper half-section, taken longitudinally on the line 2—2 of Figure 1, showing one method of keying the driving plates to the flywheel, the location of the centrifugal weights and the position of the idling springs; Figure 3 is a section through line 3—3 of Figure 2 showing the position of the weights and the method of forcing the plates into engagement; and Figure 4 is a section through line 4—4 of Figure 2 showing the keyway ears of the driving plates. In the said figures, similar numerals of reference refer to similar parts throughout the several views.

In the figures the numeral 1 designates a flywheel provided at its outer periphery with a laterally-extending annular flange 15 which has secured to it, by the screws 25, a cover plate 3 extending radially. These parts form an oil-tight enclosure which accommodates a hereinafter-described clutch.

The inner periphery of the flywheel is provided with apertures 14 by which it is secured to a flange on the engine shaft not shown, while the outer periphery of the fly-wheel is provided with the usual gear teeth 2 for starting purposes.

The numeral 24 designates a driven shaft mounted concentrically in the flywheel 1. Secured to it is the spider 19 which carries on its outer periphery the radially-extending, annular, driven, friction discs 7. The parts 24, 19 and 7 may be those in present use in automotive vehicles.

The numeral 17 designates an annular, dished member whose outer periphery is secured to the cover plate 3 by the screws 26. The numeral 23 designates a helical spring surrounding the driven shaft 24, one end of which is in contact with the member 17 while the other abuts against the disc 18 surrounding the shaft 24. This disc 18 may be moved laterally by means of a sleeve 21 operating through the ball-bearing 22 which is slidable on the sleeve 20 surrounding the shaft. The movement of the sleeve 21 is governed by a clutch pedal not shown. These parts—17, 23, 18, 22, 21, 20—may also be parts in present use.

The numeral 4 designates a driving plate positioned against the inner face of the flywheel 1. The outer periphery of this plate is provided with keyway ears adapted to engage keys which extend inward radially from the inner periphery of the flange of the flywheel 1 and are cast integral therewith.

The numerals 5 and 6 designate driving plates which are secured to the flywheel 1 in the same manner as the driving plate 4 except that the keyway ears do not extend as far from the outer periphery of the discs.

Intervening between plates 5, 6 and 4 and the driven plates 7 are other plates 8 of suitable material. These may be secured to either the driving or driven plates or left free of both as desired.

The numeral 9 designates an annular plate recessed in the cover plate 3, the inner periphery being provided with pins 16 adapted to engage with the disc 18 so that an axial movement of the latter will be transmitted to the former.

A number of pins 10 are secured to the driving plate 4 at circumferentially spaced intervals about its outer periphery and extending transversely beyond the periphery of the clutch plates to terminate in juxtaposed relation to the plate 9. The length of these pins is such as to leave a clearance between their ends and the plate 9 so as not to interfere with the proper clutching contact of the plates of the clutch. When the disc 18 is moved to cause declutching the plate 9 will have a prelateral movement before engaging the pins 10 to bring about the desired declutching.

The numeral 12, Figure 3, designates one of a number of centrifugal weights extending across the outer periphery of the friction plates. Each of the weights 12 is provided with an offset leg 27 seating back of the plate 4 in a recess 28 provided for the purpose in the flywheel. The heel of this leg forms a pivot upon which the weight turns while the lower or inner end forms a toe which engages the plate 4. On account of this formation of the end, an outward movement of the weight moves the plates axially into frictional engagement.

The numeral 13 designates an adjusting bolt threaded through the cover plate 3 and adapted to abut against the driving plate 5.

The numeral 11 designates a helical spring surrounding the pin 10 abutting against the plate 9 at one end and the plate 4 at the other. It is obvious that the spring 11 will resist an axial movement of the plate 4. This spring will hereinafter be known as the idling spring.

Having thus described the various parts throughout the views, the mode of operation will be substantially as follows; all of which will be readily understood by those skilled in the art to which this invention relates.

The parts being assembled in operative relation the adjusting screw 13 is moved to a position which forces the plates axially to such a position as to give a slight clearance; that is, so that the distance between the face of the screw and the toe of the weight 12 in its retracted position is nearly, but not entirely filled by the friction plates 4, 5, 6, 7 and 8. In this position the flywheel may revolve but no plate engagement can be effected unless the force generated by such revolution is sufficient to overcome the resistance of the idling springs 11. At a predetermined higher speed this condition will occur. Speeds below this predetermined speed are known as idling speeds.

When this idling speed is passed, the centrifugal force throws the weights 12 outward and overcomes the idling springs. The pivoting of the weights moves the plate 4 axially which, in turn, forces all the driving plates into frictional engagement with the driven plates and permits the transmission of power from the flywheel to the driven shaft 24. At slow speeds (but higher than idling speed) the pressure against the friction plates is not sufficient to cause non-slipping plate engagement so that the speed of the flywheel will be correspondingly higher than that of the shaft 24. As the speed of the flywheel becomes greater, the plate pressure becomes greater until substantially non-slipping engagement is effected. Then the speed of the driven shaft is that of the flywheel.

When a change of gears is necessary, declutching is accomplished by forcing the plate 18 forward by the use of the clutch pedal. This movement is transmitted through pins 16, plate 9, springs 11, pins 10, to the plate 4 which in turn forces the centrifugal weights 12 into their inoperative position. This releases the clutch plates from frictional engagement and permits gear shifting.

When pressure is relieved by the clutch pedal, the spring 23 forces the plate 18 away from the pins 16 and the parts return to the normal position.

While the clutch shown is designed to replace a present clutch using as many of the old parts as possible, it is obvious that a complete new structure may be desirable. I do not wish to limit myself to the exact construction shown as it is obvious that certain departures can be made therefrom without departing from the spirit and letter of my said invention, but what I claim as new and desire to secure by Letters Patent is:—

In an automatic clutch the combination of a flywheel arranged to be rotated by a driving shaft and providing an annular chamber, a rotatable member concentrically mounted within said chamber, a driven shaft connected to said rotatable member, a friction plate splined to said rotatable member, a second friction plate arranged to be rotated by said flywheel and movable towards and away from said first plate, a driving plate mounted to move in the direction to bring said plates into frictional engagement, spring means normally holding said driving plate from causing pressure upon said friction plates, centrifugally controlled weights for causing said driving plate to exert pressure upon said friction plates in opposition to said spring means, means including a manually operated part for increasing the pressure of said spring means to overcome the action of said centrifugal means and release one friction plate with respect to the other friction plate, and spring means for normally holding said pressure increasing means inoperative.

In testimony whereof I affix my signature.

HENRY H. VAIL.